3,014,933
MANUFACTURE OF 19-NORTESTOSTERONE-17-PROPIONATE
Pemmaraju Narasimha Rao, 2014 W. Gramercy Place, San Antonio, Tex.
No Drawing. Filed Mar. 22, 1961, Ser. No. 97,438
1 Claim. (Cl. 260—397.4)

19-nortestosterone-17-propionate is known to possess valuable anabolic activity with a desirably high ratio of anabolic to androgenic activity. Preparation of this valuable chemical hs ordinarily been effected by heating 19-nortestosterone with propionic anhydride in the presence of pyridine, and recovering the 19-nortestosterone-17-propionate by recrystallization. Unfortunately, this process has been found to suffer from the disadvantage that it gives rather low yields of pure material.

It is an object of this invention to provide a method of manufacturing 19-nortestosterone-17-propionate of good purity in high yields.

My studies indicate that the prior method of preparing 19-nortestosterone-17-propionate tends to result in the formation of a certain amount of the 3-enol ester, and that the separation of this contaminant necessitates recrystallization and thereby reduces the yield of pure 19-nortestosterone-17-propionate.

Accordingly, I have devised a method of preparing 19-northestosterone-17-propionate which includes a step of protecting the 3-keto grouping of 19-nortestosterone so it cannot enolize and undergo this undesired acylation. 17-acylation of the protected molecule then proceeds smoothly, and the protective group is then removed, leaving pure 19-nortestosterone propionate in high yield.

My new process may be illustrated schematically as follows:

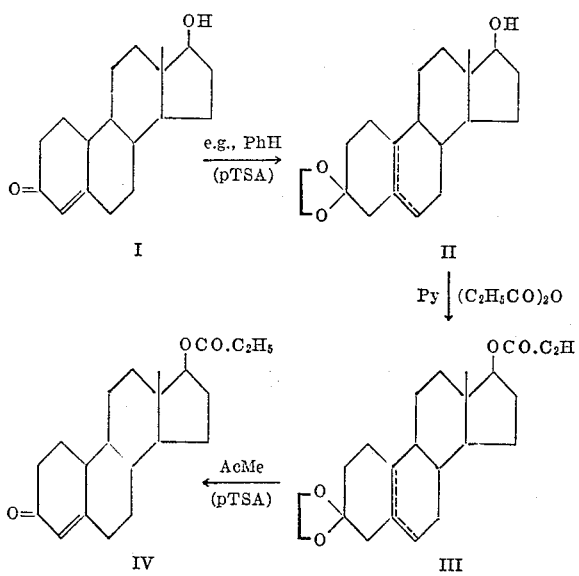

As indicated, 19-nortestosterone (I) is boiled with ethylene glycol, benzene and a catalytic amount of p-toluene sulfonic acid under a Dean-Stark trap and thus converted to the corresponding 3-ethylenedioxy derivative (II); the 4,5-double bond shifts partly to the 5,6- and partly to the 5,10-position. The hydroxy-ketal (II) is then treated at room temperature with pyridine and propionic anhydride and converted to the ketal propionate (III). This ketal propionate is then heated with acetone and a trace of p-toluene sulfonic acid and thereby converted to 19-nortestosterone propionate, in very good purity, free of 3-acylates.

It will be obvious to skilled chemists that certain changes and sustitutions may be made in the above-outlined scheme without departing from the spirit and substance of my invention. For example, in the reaction stage corresponding to the conversion of I to II (ketalization), the ethylene glycol may be replaced by propylene glycol, 1,2-butylene glycol or 2,3-butylene glycol without seriously affecting the over-all synthesis; likewise the benzene could be replaced by toluene, xylene, petroleum ether, or other inert water-immiscible solvent suitable for azeotropic abstraction of water from a reaction mixture; the toluene sulfonic acid could equally well be replaced by benzene sulfonic acid, naphthalene sulfonic acid, ethane sulfonic acid, etc. In the reaction stage corresponding to the conversion of II to III (acylation), other tertiary amines, such as triethylamine, dimethylaniline, quinoline, picolines, etc., may be used instead of pyridine; propionyl chloride or bromide lead to the same final result as propionic anhydride, while employment of acetic anhydride or acetyl chloride in place of propionic anhydride leads to the ultimate preparation of 19-nortestosterone-17-acetate, butyric anhydride or butyryl chloride yields 19-nortestosterone-17-butyrate, etc. Finally, while the reaction stage corresponding to the conversion of III to IV (exchange dioxolanation) has been shown and is described as involving treatment of III with acetone and p-toluene sulfonic acid, essentially the same results can be obtained by using methylethylketone, cyclohexanone, etc., in place of acetone or by substituting another strong acid for the p-toluene sulfonic acid; other hydrocarbon sulfonic acids or even sulfuric acid may be employed.

The following examples show how my invention may be practiced.

*Example I*

A mixture of 19-nortestosterone (7 g.) benzene (525 ml.) ethylene glycol (52 ml.) and p-toluene sulfonic acid monohydrate (0.35 g.) was boiled, with stirring, under a modified Dean-Stark phase separator until no more water phase separated (ca. 20–24 hrs.). At the completion of this step the solution was washed with aqueous sodium bicarbonate, and then with water until neutral, and the solvent was then removed under reduced pressure in a stream of nitrogen. 3-ethylenedioxy-19-nortestosterone (II) (8.3 g.) was obtained as a gum.

*Example II*

Without further purification, the product of Example I was dissolved in pyridine (20 ml.) and propionic anhydride (8 ml.) was added and kept at room temperature for eighteen hours. The excess pyridine was then removed under reduced pressure in a stream of nitrogen and the residue was dissolved in ether. The ether extract was washed with sodium bicarbonate solution, and then with water until neutral, and dried over sodium sulphate. After evaporating the solvent 3-ethylenedioxy-19-nortestosterone-17-propionate (III) (10 g.) was obtained as a solid and no further purification was attempted.

*Example III*

The above solid (10 g.) was dissolved in anhydrous acetone (150 ml.) and p-toluene sulfonic acid monohydrate (0.4 g.) was added and the contents heated under reflux for fourteen hours. After this time the reaction mixture was concentrated to a small volume (20 ml.) and then diluted with water. The precipitated 19-nortestosterone-17-propionate (8.3 g.) was filtered and washed with sodium bicarbonate solution and then with water until the washings were neutral.

This product had a M.P. of 60–65°. On further recrystallization from aqueous methanol, (IV) was obtained with water of crystallization and melted at 71–73°. A sample dried in high vacuum over phosphorus pentoxide for twenty hours at 35° melted at 50–51° and still contained half a molecule of water of crystallization. $(\alpha)_D^{23.5}$ +58.0° (in chloroform);

$\lambda_{max.}^{methanol}$ 240 m$\mu$, $\epsilon = 17,280$; $\nu_{max.}^{KBr}$ 1727, 1668, and 1613 cm.$^{-1}$

*Analysis.*—Calcd. for $C_{21}H_{30}O_3$, $\frac{1}{2}H_2O$ (339.45): C, 74.29; H, 9.20. Found: C, 74.56; H, 9.09.

A sample was crystallized from isopropyl ether and was then found to melt between 52 and 55° C.

$$[\alpha]_D^{26.7} = +43.7°$$

$\lambda_{max} = 240$ m$\mu$, $\epsilon = 17,834$. This product still contains one-half molecule of water of crystallization, as shown by the infra red spectrum and confirmed by elemental analysis. C=74.55%; H=9.25%.

I claim:

A method of preparing 19-nortestosterone-17-propionate which comprises the steps of: (1) boiling a mixture of 19-nortestosterone, benzene, ethylene glycol, and p-toluene sulfonic acid, condensing the vapors evolved, stratifying the condensate, returning the non-aqueous condensate layer to the boiling mixture, and continuing said boiling, condensing, stratifying, separating, and returning until condensation of water has ceased; (2) washing the reacted mixture with an aqueous alkali to remove the sulfonic acid and the unreacted glycol, and recovering a ketal product by evaporation of solvent from the said washed reaction mixture; (3) dissolving said ketal product in a mixture of pyridine and propionic anhydride and allowing acylation to proceed at room temperature; (4) evaporating unreacted pyridine from the acylation mixture, dissolving the residue in ether, washing said ether solution, drying the washed solution, and evaporating off the solvent to yield a residue of an acylated ketal; (5) dissolving said acylated ketal in acetone containing a catalytic amount of p-toluene sulfonic acid and boiling the resulting solution under reflux until exchange dioxonolation is complete, evaporating a major portion of the solvent, diluting the concentrated solution with water, and recovering 19-nortestosterone-17-propionate by filtration.

No references cited.